United States Patent
Lee

(10) Patent No.: US 9,866,011 B2
(45) Date of Patent: Jan. 9, 2018

(54) DEVICE AND METHOD FOR INTERRUPTING BATTERY CURRENT

(71) Applicants: Hyundai Motor Company, Seoul (KR); Kia Motors Corporation, Seoul (KR)

(72) Inventor: Young Jong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 474 days.

(21) Appl. No.: 14/569,646

(22) Filed: Dec. 13, 2014

(65) Prior Publication Data

US 2015/0236501 A1  Aug. 20, 2015

(30) Foreign Application Priority Data

Feb. 18, 2014  (KR) .................. 10-2014-0018205

(51) Int. Cl.
| | |
|---|---|
| *H02H 3/00* | (2006.01) |
| *H02H 7/18* | (2006.01) |
| *H02H 3/06* | (2006.01) |
| *H02H 3/08* | (2006.01) |
| *H02H 11/00* | (2006.01) |
| *H02J 7/00* | (2006.01) |

(52) U.S. Cl.
CPC ............ *H02H 7/18* (2013.01); *H02H 3/06* (2013.01); *H02H 3/08* (2013.01); *H02H 11/005* (2013.01); *H02J 7/0031* (2013.01)

(58) Field of Classification Search
CPC ...................................... H02H 7/18
USPC ........................................ 361/57
See application file for complete search history.

(56) References Cited

U.S. PATENT DOCUMENTS

| | | | | |
|---|---|---|---|---|
| 6,349,022 B1 * | 2/2002 | Myong | ................ | H02H 3/025 361/57 |
| 6,737,832 B2 * | 5/2004 | Uchida | .................... | H02J 1/04 320/138 |
| 2013/0200690 A1 * | 8/2013 | Rini | ..................... | H02J 7/0031 307/9.1 |

FOREIGN PATENT DOCUMENTS

| | | |
|---|---|---|
| JP | 08-033187 A | 2/1996 |
| JP | 2007-255269 A | 10/2007 |
| JP | 2012-162139 A | 8/2012 |
| JP | 2013-023103 A | 2/2013 |
| JP | 2013-091424 A | 5/2013 |
| KR | 20-1998-0022840 U | 7/1998 |
| KR | 10-2012-0104879 A | 9/2012 |

\* cited by examiner

*Primary Examiner* — Stephen W Jackson
(74) *Attorney, Agent, or Firm* — Mintz Levin Cohn Ferris Glovsky and Popeo, P.C.; Peter F. Corless

(57) ABSTRACT

A device and a method are provided for interrupting battery current using a latch relay for substantially high current interruption, which enable the latch relay to return to an ON position after operating to an OFF position. Accordingly, the latch relay for substantially high current interruption is operated to return to an ON (closed) position in only a normal state other than a short-circuit state by self-diagnosing the presence of occurrence of a short circuit before the latch relay attempts to return to the ON (closed) position after operating to an OFF (open) position. Therefore the latch relay may not become fixed and damaged due to the returning of the latch relay to the ON (closed) position during a short-circuit state, thereby guaranteeing the reuse of the latch relay.

5 Claims, 2 Drawing Sheets

DEVICE AND METHOD FOR INTERRUPTING BATTERY CURRENT

CROSS-REFERENCE TO RELATED APPLICATION(S)

Pursuant to 35 U.S.C. §119(a), this application claims priority to and benefit of Korean Patent Application No. 10-2014-0018205 filed on Feb. 18, 2014, the entire contents of which are incorporated herein by reference.

BACKGROUND

Technical Field

The present invention relates to a device and a method for interrupting battery current. More particularly, the present invention relates to a device and a method for interrupting battery current using a latch relay for substantially high current interruption, enabling the latch relay to return to an ON position after operating to an OFF position.

Background Art

When a short circuit occurs at a ground side of a vehicle power line due to a collision or another abnormal condition, a fire may occur due to an overcurrent condition. To prevent such an overcurrent condition, a battery current interrupting device using an inflator (e.g., gunpowder explosion) or a latch relay may be used. In a case of the battery current interrupting device using the inflator, when a vehicle collision is sensed, current is applied in an airbag engine control unit (ECU) so that the current interrupting device performs an OFF (open) operation, thereby interrupting battery current. However, this system is inconvenient because performing an ON (closed) operation after an OFF operation should be performed by repairing or replacing the current interrupting device in a service center.

As a result, when the battery current interrupting device uses an inflator, the current interrupting device is operated only as a result of a vehicle collision. Also functionally limiting, is that the current interrupting device my not be configured to interrupt battery current when overcurrent is generated by an abnormal state except as a result of a vehicle collision.

FIG. 1 is an exemplary circuit diagram illustrating a conventional high current interrupting device using a latch relay. FIG. illustrates a battery 10, and a substantially high current interrupting control device 20 including a latch relay. The substantially high current interrupting control device 20 using the latch relay senses a substantially high current/short circuit in a vehicle collision or another abnormal state, and allows the latch relay to open, interrupting the battery current at the moment when the substantially high current/ short circuit is sensed. A user may operate the substantially high current interrupting control device 20 to enable the latch relay to return to a closed (ON) position allowing flow of the battery current when the user desires. The substantially high current interrupting control device 20 may be configured to open the latch relay when sensing a substantially high current/short circuit during a vehicle collision or other abnormal state, so that interruption of the battery current, i.e., to hinder or prevent a substantially high current from flowing in a vehicle load or the like, may be possible. Accordingly, reducing a likelihood of a fire caused by an overcurrent state may be possible. However when the latch relay attempts to return to the ON (closed) position after operating to the OFF (open) position due to a vehicle collision or other abnormal state, the short circuit may coexist with the high current. In this case, there is a problem in that a contact point of the latch relay may be fixed and damaged by a substantially high current exceeding a standard current of the latch relay. In addition, the reuse of the latch relay may be impossible due to damage to the contact point of the latch relay, and therefore, the damaged latch relay should be replaced.

SUMMARY

The present invention provides a device and a method for interrupting battery current, in which a latch relay for high current interruption is operated to return to an ON (closed) position in only a normal state, other than a short-circuit state, by self-diagnosing a short circuit before the latch relay attempts to return to the ON (closed) position after operating to an OFF (open) position. Therefore, fixing of and damage to the latch relay may be avoided, by preventing the latch relay from returning to the ON (closed) position during a short-circuit state, thereby allowing for possible reuse of the latch relay.

According to an exemplary embodiment, the present invention provides a device for interrupting battery current, including: a short-circuit diagnosis circuit configured to self-diagnose whether a short circuit of battery current occurs before a latch relay for interrupting substantially high current of a battery operates to an OFF position and then returns to an ON position. Further, the short-circuit diagnosis circuit may be connected between the battery and the latch relay. In an exemplary embodiment, the short-circuit diagnosis circuit may include: a diagnosis current driving unit and a shunt resistor, serially connected to a branch line, branched between the battery and the latch relay; a current measuring unit configured to measure a shunt current passing through the shunt resistor from the diagnosis current driving unit; and a controller configured to compare the shunt current measured in the current measuring unit with a threshold value, and operate the latch relay to return to the ON position when the shunt current is not more than the threshold value.

Another exemplary embodiment of the present invention provides a method for interrupting battery current including: determining whether a latch relay for interrupting substantially high current of a battery attempts to return to an ON position after operating to an OFF position; diagnosing whether a short circuit of the battery current occurs when the latch relay attempts to return to the ON position; and maintaining the latch relay in the OFF position when it is diagnosed that the short circuit of the battery current has occurred, and operating the latch relay to return to the ON position when it is diagnosed that the short circuit of the battery current has not occurred.

In an exemplary embodiment, the diagnosing of whether the short circuit of the battery current occurs when the latch relay attempts to return to the ON position may include: operating a diagnosis current driving unit connected between the battery and the latch relay allowing the battery current to pass therethrough when the latch relay attempts to return to the ON position; allowing the battery current from the diagnosis current driving unit to pass through a shunt resistor, and measuring a shunt current passing through the shunt resistor; and comparing the shunt current measured in a current measuring unit with a threshold value, wherein the latch relay is maintained to operate to the OFF position in response to the shunt current being not less than the threshold value, and the latch relay is controlled to return to the ON position in response to the shunt current not being more than the threshold value.

As described above, the present invention has advantages as follows.

First, when the latch relay operates to the OFF position interrupting the battery current, and then returns to the ON position allowing the battery current to flow in a substantially high current/short circuit as a result of a vehicle collision or other abnormal state, the presence a short circuit of the battery current may be self-diagnosed before the latch relay returns to the ON position, so that the latch relay may return to the ON position in only a normal state, other than a short-circuit state. Accordingly, a reduced likelihood that a contact point of the latch relay becomes fixed and damaged when the latch relay returns to the close position in the short-circuit state, is possible. Second, reducing the likelihood or prevention of damage of the latch relay may be possible, thereby allowing for reuse of the latch relay. Third, as the reuse of the latch relay is made possible, maintenance and repair costs may be reduced.

BRIEF DESCRIPTION OF THE DRAWINGS

The above and other objects, features and other advantages of the present invention will be more clearly understood from the following detailed description when taken in conjunction with the accompanying drawings, in which.

Figure 1:
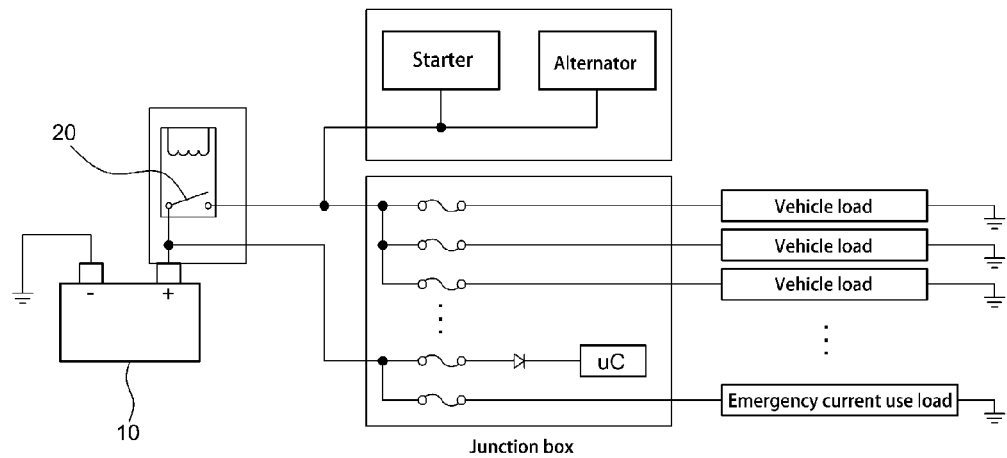
FIG. 1 is an exemplary circuit configuration diagram illustrating a conventional battery current interrupting device.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

In conventional systems as described above, when a latch relay connected to an output side of a battery performs an OFF (open) operation and then returns to an ON position in a battery current short circuit state, in order to interrupt a substantially high current of the battery in a situation such as a vehicle collision, a contact point of the latch relay may be fixed and damaged, and a fire may be caused by a spark.

However, according to exemplary embodiments of the present invention, when a latch relay operates to an OFF position interrupting battery current, and then returns to an ON position allowing for flow of battery current during a state of a substantially high current/short circuit of the battery due to a vehicle collision or other abnormal state, the short circuit of the battery current may be self-diagnosed before the latch relay returns to the ON position, so that the latch relay may return to the ON position in only a normal state, i.e., a state in which there is no short circuit.

Figure 2:
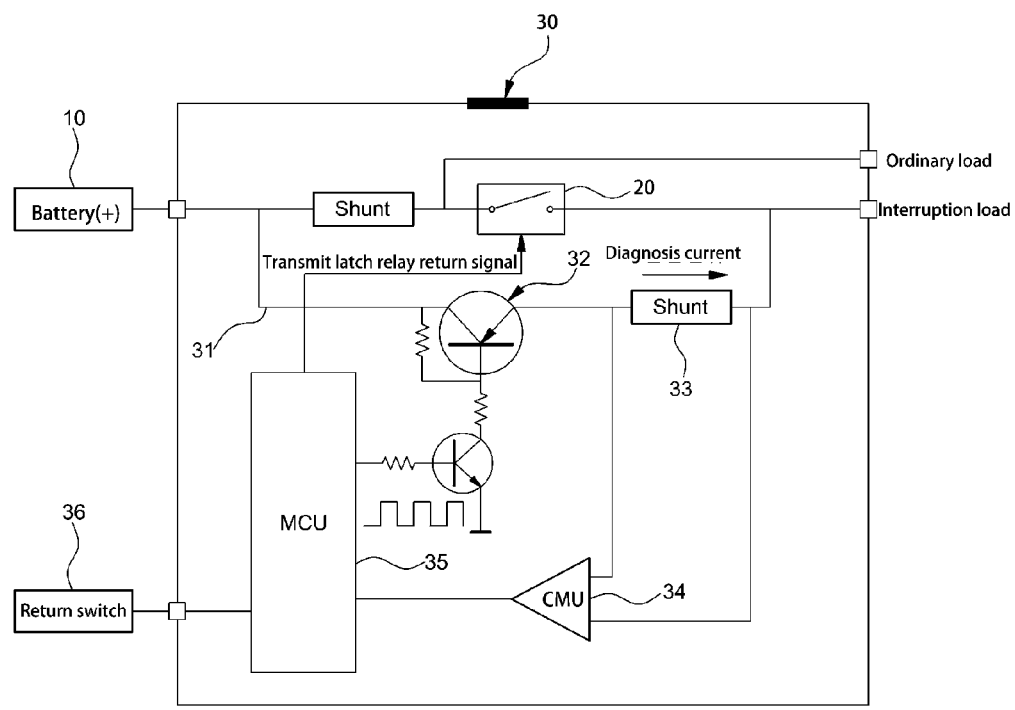
FIG. 2 is an exemplary circuit configuration diagram illustrating a device for interrupting battery current according to an exemplary embodiment of the present invention.

FIG. 2 is an exemplary circuit diagram illustrating a device for interrupting battery current according to an exemplary embodiment of the present invention. FIG. 2 illustrates a short-circuit diagnosis circuit 30. When a latch relay 20 operates to an OFF position interrupting battery current and then return to an ON position allowing flow of the battery current when a user turns the current ON, after aa substantially high current/short circuit state of a battery 10, e.g., after a vehicle collision or other abnormal state, the short-circuit diagnosis circuit 30 may be configured to self-diagnose whether a short circuit of the battery current occurs before the latch relay 20 returns to the ON position.

To this end, the short-circuit diagnosis circuit 30 may be branched and connected between an output side (+) of the battery 10 and the latch relay 20 for a substantially high current interruption. The latch relay 20 may be configured to interrupt the battery current and maintain an OFF state until the short circuit of the battery current is diagnosed. Therefore, the short diagnosis circuit 30 may be branched and connected between the output side (+) of the battery 10 and the latch relay 20 for substantially high current interruption in order to diagnose whether the short circuit of the battery current occurs and to smoothly measure current from the battery 10.

A separate branch line 31 may be electrically connected between the output side (+) of the battery 10 and the latch relay 20 for substantially high current interruption. Particularly, a diagnosis current driving unit 32 and a shunt resistor 33 may be serially connected to the branch line 31. The diagnosis current driving unit 32 may be a power switching element (e.g., a MOSFET), and may be configured to allow the battery current to flow toward the shunt resistor 33 when the latch relay 20 attempts to return to the ON position after operating to the OFF position. The shunt resistor 33 may be connected to measure the battery current.

In this state, a current measuring unit (CMU) 34 configured to measure a shunt current passing through the shunt resistor 33 from the diagnosis current driving unit 32 may be connected at front and rear positions of the shunt resistor 33. In addition, an output terminal of the current measuring unit 34 may be connected to an input terminal of a controller 35, so that a measurement signal of the measured shunt current may be transmitted to the controller 35.

The output terminal of the controller 35 may be connected to the latch relay 20, and accordingly, the controller 35 may be configured to compare the shunt current measured in the current measuring unit with a threshold value. When the shunt current is not more than the threshold value, the controller 35 may be configured to operate the latch relay 20 to operate to the ON position.

Figure 3:
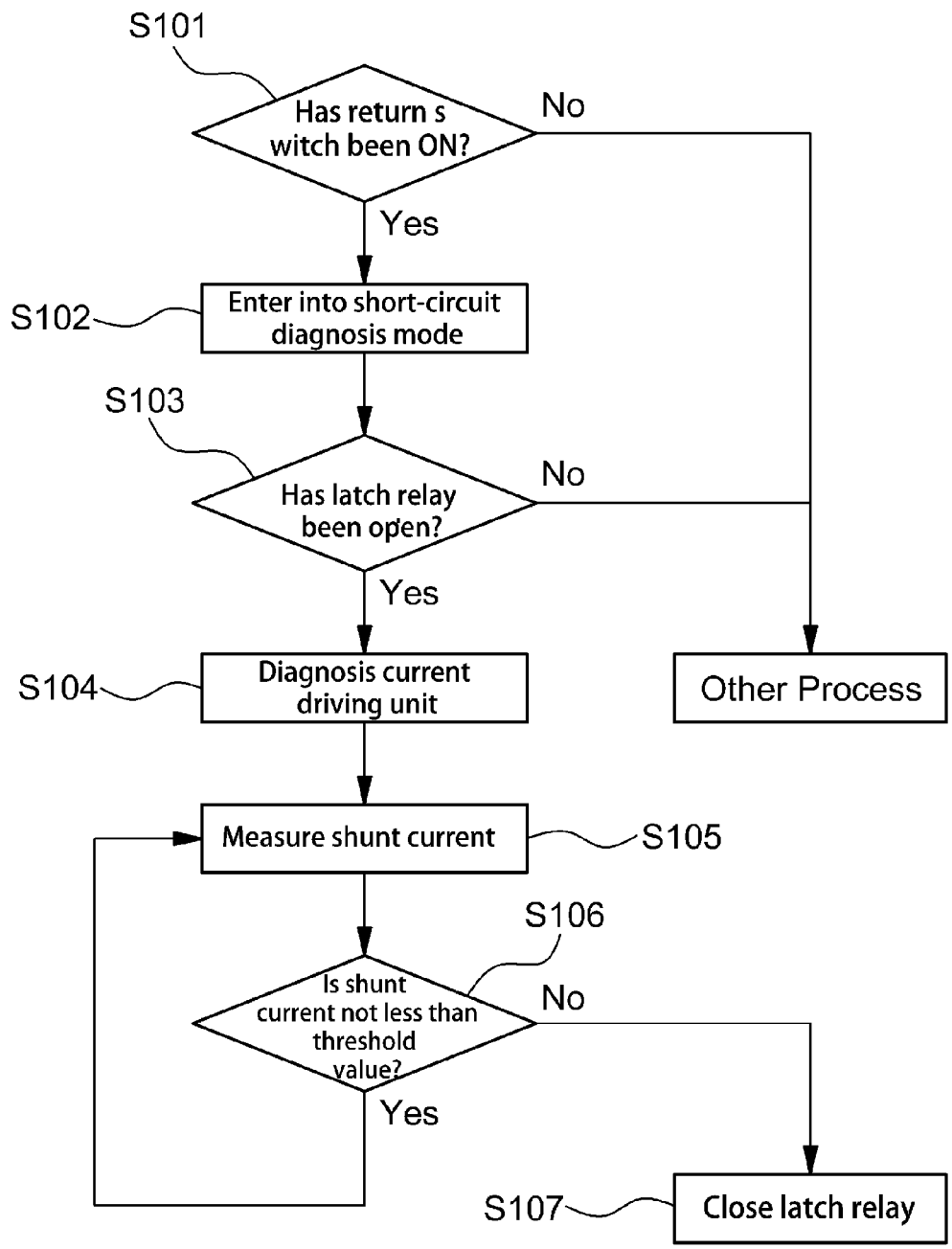
FIG. 3 is an exemplary flowchart illustrating a method for interrupting battery current according to an exemplary embodiment of the present invention.

Here, an exemplary method for interrupting battery current in the device configured according to exemplary embodiments of the invention, as described above, will be described with reference to FIGS. 2 and 3. In the method, the latch relay 20 may be controlled to operate to the open position by sensing the substantially high current/short circuit in the vehicle collision or abnormal state, so that it may be possible to sense the battery current, i.e., the substantially high current flowing in a vehicle load or the like. Accordingly, it may be possible to reduce likelihood or prevent a fire caused by the occurrence of overcurrent. First, it a determination may be made whether the latch relay 20 attempts to return to the ON position when necessary after operating to the OFF position in order to interrupt the substantially high current from the battery 10.

Preferably, a determination may be made whether a relay return switch 36 is manipulated (S101). When the relay return switch 36 is manipulated, when the latch relay 20 attempts to return to the ON position, the entry into a short-circuit diagnosis mode for determining the presence of a short circuit of the battery current is made (S102). After the controller 35 identifies that the OFF operation of the latch relay 20 is maintained (S103), the diagnosis current driving unit 32 connected between the battery 10 and the latch relay 20 may be switched so that current may flow therein (S104).

Thus, the current from the battery 10 may flow through the shunt resistor 33 via the diagnosis current driving unit 32. In this state, a shunt current passing through the shunt resistor 33 may be measured (S105). In other words, the current measuring unit 34 connected at the front and rear positions of the shunt resistor 33 may be configured to measure the shunt current passing through the shunt resistor 33. When the shunt current measured in the current measuring unit 34 is transmitted to the controller 35, the controller 35 may be configured to compare the measured shunt current with a threshold value (S106). As a result, when the shunt current is not less than the threshold value, the controller 35 may be configured to operate the latch relay 20 to maintain the OFF operation. When the shunt current is not more than the threshold value, the controller 35 may be configured to operate the latch relay 20 to operate to the ON position (S107).

In other words, when the shunt current is not less than the threshold value, it may be diagnosed that the short circuit of the battery current has occurred, and accordingly, the controller 35 may be configured to operate the latch relay 20 to maintain the OFF operation. When the shunt current is not more than the threshold value, it may be diagnosed that the short circuit of the battery current has not occurred, and accordingly, the controller 35 may be configured to operate the latch relay 20 to operate to the ON position.

As described above, the a short circuit of the battery current may be self-diagnosed before the latch relay returns to the ON position, so that the latch relay may be operated to return to the ON position in only a normal state, other than a short-circuit state. Accordingly, a reduced the likelihood of prevention of the conventional problem that the contact point of the latch relay is fixed and damaged when the latch relay returns to the close position in the short-circuit state may be possible.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A device for interrupting battery current comprising:
   a short-circuit diagnosis circuit configured to self-diagnose whether a short circuit of battery current occurs before a latch relay, for interrupting a substantially high current of a battery, operates to an OFF position and then returns to an ON position,
   wherein the short-circuit diagnosis circuit is connected between the battery and the latch relay, and
   wherein the short-circuit diagnosis circuit includes;
      a controller configured to receive a measured shunt current through a shunt resistor, measured by a diagnosis current driver, the diagnosis current driver connected in series with the shunt resistor and a branch line branched between the battery and the latch relay,
      wherein the controller is configured to compare the shunt current with a threshold value, and operate the latch relay to return to the ON position when the shunt current is less than or equal to the threshold value.

2. A method for interrupting battery current, the method comprising:

determining, by a controller, whether a latch relay, for interrupting a substantially high current of a battery, attempts to return to the ON position after operating to the OFF position;

diagnosing, by the controller, whether a short circuit of battery current occurs when the latch relay attempts to return to the ON position; and maintaining, by the controller, the latch relay in the OFF position when it is diagnosed that the short circuit of the battery current has occurred, and operating the latch relay to return to the ON position when it is diagnosed that the short circuit of the battery current has not occurred.

3. The method of claim 2, wherein the diagnosing of whether the short circuit of the battery current occurs when the latch relay attempts to return to an ON position includes:

operating, by the controller, a diagnosis current driver connected between the battery and the latch relay so that the battery current passes therethrough when the latch relay attempts to return to the ON position;

allowing, by the controller, the battery current from the diagnosis current driving unit to pass through a shunt resistor, and measuring a shunt current passing through the shunt resistor; and comparing, by the controller, the shunt current measured in a current measuring unit with a threshold value, wherein the latch relay is maintained to operate to the OFF position when the shunt current is greater than the threshold value, and the latch relay is operated to return to the ON position when the shunt current is less than or equal to threshold value.

4. A non-transitory computer readable medium containing program instructions executed by a processor or controller for interrupting battery current, the computer readable medium comprising:

program instructions that determine whether a latch relay, for interrupting substantially high current of a battery, attempts to return to an ON position after operating to an OFF position;

program instructions that diagnose whether a short circuit of battery current occurs when the latch relay attempts to return to the ON position; and program instructions that maintain the latch relay in the OFF position when it is diagnosed that the short circuit of the battery current has occurred, and operate the latch relay to return to the ON position when it is diagnosed that the short circuit of the battery current has not occurred.

5. The non-transitory computer readable medium of claim 4 further comprising:

program instructions that operate a diagnosis current driver connected between the battery and the latch relay so that the battery current passes therethrough when the latch relay attempts to return to the ON position;

program instructions that allow the battery current from the diagnosis current driving unit to pass through a shunt resistor, and measure a shunt current passing through the shunt resistor; and program instructions that compare the shunt current measured in a current measuring unit with a threshold value, wherein the latch relay is maintained to operate to the OFF position when the shunt current is greater than the threshold value, and the latch relay is controlled to return to the ON position when the shunt current is less than or equal to threshold value.

* * * * *